United States Patent
Yuan et al.

(10) Patent No.: US 12,244,218 B2
(45) Date of Patent: Mar. 4, 2025

(54) POWER GRID

(71) Applicant: Hitachi Energy Ltd, Zürich (CH)

(72) Inventors: ChunMing Yuan, Beijing (CN); Peter Steimer, Ehrendingen (CH); Adrian Timbus, Mellingen (CH); Philippe Maibach, Muhen (CH); Juergen Steinke, Albbruck (DE); Stephane Isler, Faucigny (FR); Ralph Burkart, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/022,551

(22) PCT Filed: Oct. 15, 2021

(86) PCT No.: PCT/EP2021/078692
§ 371 (c)(1),
(2) Date: Feb. 22, 2023

(87) PCT Pub. No.: WO2022/079288
PCT Pub. Date: Apr. 21, 2022

(65) Prior Publication Data
US 2023/0318435 A1    Oct. 5, 2023

(30) Foreign Application Priority Data

Oct. 16, 2020  (CN) .......................... 202011108646.3
Oct. 21, 2020  (EP) ..................................... 20203159

(51) Int. Cl.
*H02M 1/00*       (2007.01)
*H02M 3/335*     (2006.01)

(52) U.S. Cl.
CPC ..... *H02M 1/0067* (2021.05); *H02M 3/33576* (2013.01)

(58) Field of Classification Search
CPC ........... H02M 1/0067; H02M 3/33576; H02M 3/33584; H02M 1/0074; H02M 3/01;
(Continued)

(56) References Cited

U.S. PATENT DOCUMENTS

2005/0105306 A1   5/2005  Deng et al.
2015/0188350 A1   7/2015  Deboy
(Continued)

FOREIGN PATENT DOCUMENTS

CN   104852588 A   8/2015
CN   105939106 A   9/2016
(Continued)

OTHER PUBLICATIONS

International Search Report and Written Opinion of the International Searching Authority, PCT/EP2021/078692, mailed Jan. 21, 2022, 11 pages.
(Continued)

*Primary Examiner* — Rexford N Barnie
*Assistant Examiner* — Xuan Ly
(74) *Attorney, Agent, or Firm* — Sage Patent Group (57) ABSTRACT

The disclosure relates to a power grid, comprising a converting stage comprising a plurality of DC/DC converters. At least one of the DC/DC converters is a single-stage isolated DC/DC converter comprising a voltage control configured to control a voltage of the respective DC/DC converter. The DC/DC converters are connected in series and at least one of the plurality of converters of the converting stage is configured to provide a respective predetermined output voltage to a load.

19 Claims, 11 Drawing Sheets

(58) Field of Classification Search
CPC ......... H02M 3/33571; H02M 3/33573; H02M 3/33561; H02M 3/3353; H02M 1/0077; H02M 1/008; H02M 1/00; H02M 3/335; H02J 1/086; H02J 1/082; H02J 3/381; H02J 3/32; H02J 2300/40; Y02E 10/56
USPC .......................................................... 307/18
See application file for complete search history.

(56) References Cited

U.S. PATENT DOCUMENTS

| | | | |
|---|---|---|---|
| 2016/0261205 A1* | 9/2016 | Kolar | H02M 1/32 |
| 2020/0335975 A1* | 10/2020 | Kim | H02M 5/4585 |

FOREIGN PATENT DOCUMENTS

| | | | |
|---|---|---|---|
| EP | 2180586 B1 | | 4/2010 |
| JP | H0458764 A | | 2/1992 |
| JP | 2007258106 A | | 10/2007 |
| JP | 2014140292 A | | 7/2014 |
| JP | 2015515243 A | | 5/2015 |
| KR | 102543641 B1 | | 8/2020 |
| WO | 2020091168 A1 | | 5/2020 |
| WO | WO2020091168 | * | 5/2020 |

OTHER PUBLICATIONS

Tao Meng et al: "An input-series multiple-output auxiliary DC/DC converter", 2016 IEEE 8th International Power Electronics and Motion Control Conference (IMPEMC-ECCE Asia), IEEE, XP032924770, May 22, 2016, 5 pages.

Hoffman, Felix, et al.: "Multiwinding based Semi-Dual Active Bridge Converter", 2020 IEEE Applied Power Electronics Conference and Exposition (APEC), IEEE, XP033784998, Mar. 15, 2020, 8 pages.

Ricchiuto D, et al.: "Overview of multi-DC-bus solutions for DC microgrids", 2013 4th IEEE International Symposium on Power Electronics for Distributed Generation Systems (PEDG), IEEE, XP032586266, Jul. 8, 2013, 8 pages.

Ronan, Edward R., et al.: "A power electronic-based distribution transformer", IEEE Transactions on Power Delivery, vol. 17, No. 2, Apr. 2, 2002, 7 pages.

Isler, Stephane, et al.: "Development of a 100 kW, 12.5 kV, 22 kHz and 30 kV Insulated Medium Frequency Transformer for Compact and Reliable Medium Voltage Power Conversion", CERN—European Organization for Nuclear Research, Technology Department, ISBN: 978/9075815276, 10 pages.

M La Mendola, et al. "Four-Port Bidirectional Dual Active Bridge Converter for EVs Fast Charging", C-PED, Center for Power Electronics and Drives, Rome, Italy, 7 pages.

Brando, G., et al.: "Power Electronic Transformer application to Grid Connected Photovoltaic Systems", Department of Electrical Engineering University of Naples, 6 pages.

Ortiz, Gabriel, et al,: "Solid-State-Transformer with Multiple LVDC Outputs Employing Interconnecting Converters", Invention Disclosure, ABB Switzerland Ltd., ZCRD Corporate Research, Oct. 16, 2019, 18 pages.

Indian Office Action, Indian Application No. 202347013754, mailed Oct. 20, 2023, 8 pages.

First Office Action for Chinese Patent Application No. 2020111086463, mailed Apr. 9, 2024, 9 pages.

Notice of Reasons for Refusal, Japanese Patent Application No. 2023-514936, mailed Apr. 24, 2024, 11 pages.

* cited by examiner

POWER GRID

CROSS REFERENCE TO RELATED APPLICATIONS

This application is a 35 U.S.C. § 371 national stage application of PCT International Application No. PCT/EP2021/078692 filed on Oct. 15, 2021, which in turn claims priority to European Patent Application No. 20203159.7, filed on Oct. 16, 2020, the disclosures and content of which are incorporated by reference herein in their entireties.

TECHNICAL FIELD

The present disclosure relates to a power grid. In particular, the present disclosure proposes a power redistribution or distribution and collection grid based on series connected converters.

BACKGROUND

To achieve individual voltage control of the connected loads, energy storage elements and energy sources converters based on SiC MOSFETs (Silicon Carbide Metal-Oxide-Semiconductor Field-Effect Transistors) are preferably used. Power distribution units for the individual loads allow efficient use of the infrastructure and increased availability. Overall energy management of the innovative power distribution and collection grid enable highest efficiency and control of the electrical energy costs.

The energy sources as well as the loads have changed in recent years, leading to different requirements of a power grid. Typical new loads and sources in the distribution grid are e.g., heat pumps, mainly AC (alternating current) connected, datacenter and communication infrastructure, battery energy systems at the grid edge, and electric vehicle DC (direct current) chargers for electric vehicles (EV), E-buses, E-trucks and E-trains and renewables like photovoltaic (PV) solar and wind.

State-of-the-art distribution medium voltage or high voltage DC to low voltage DC (MVDC/LVDC or HVDC/LVDC) converters with galvanic insulation are often based on the ISOP topology (input series, output parallel).

Figure 1:
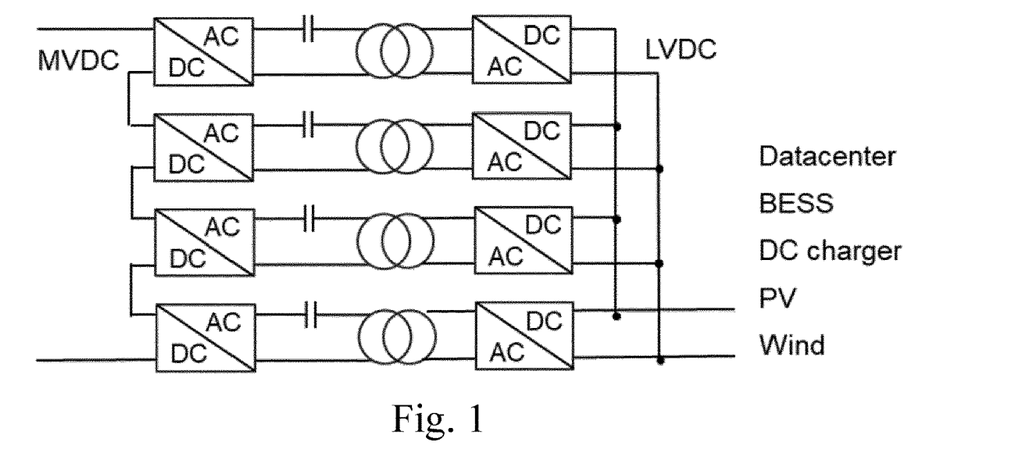
FIGS. 1 to 4 show configurations according to the state of the art.

A typical MVDC/LVDC converter utilising the ISOP topology and being based on the series resonant converter (SRC) is shown in FIGS. 1a to 1c. Typically, a post-regulation or pre-regulation stage is needed for the series resonant converter topology to control the output voltage needed. FIG. 1 shows a basic configuration having a MVDC input and a plurality of DC/AC converters connected in series. The DC/AC converters are coupled via transformers to respective AC/DC converters. The low voltage DC output of the AC/DC converters is connected in parallel, i.e., forming an ISOP topology, and may be connected to datacenters, battery energy storage systems (BESS), DC chargers, photovoltaics, or wind power plants.

Figure 2:
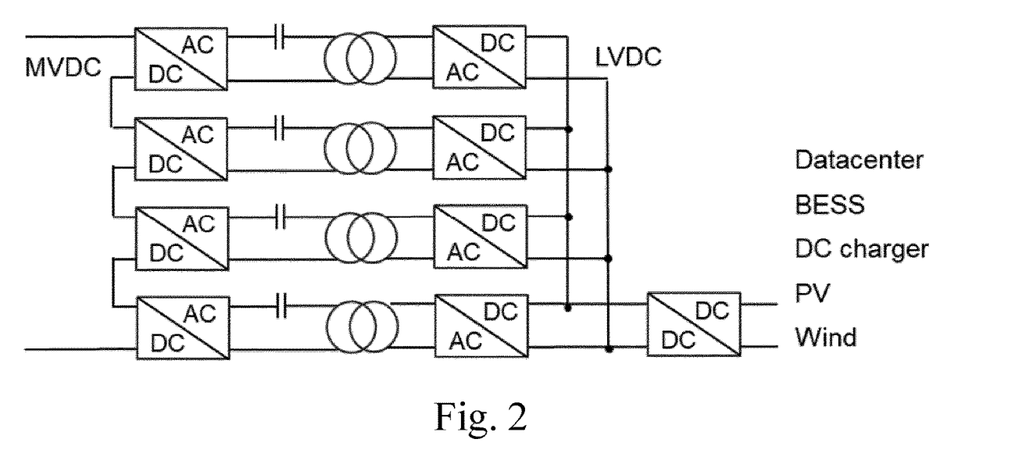
Figure 3:
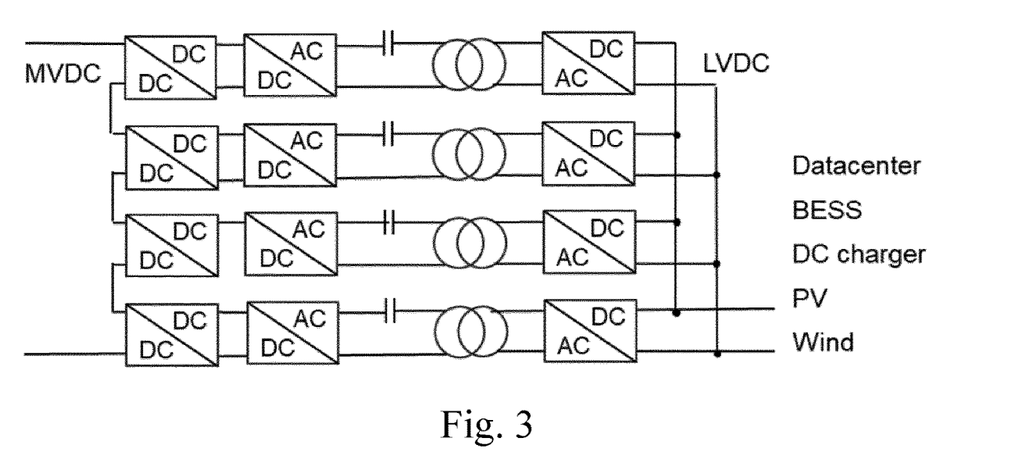

The configuration of FIG. 2 is based on FIG. 1 and additionally comprises a post-regulation DC/DC converter connected to the parallel output. FIG. 3 on the other hand is also based on the configuration of FIG. 1 but comprises a pre-regulation of DC/DC converters connected in series upstream of each of the DC/AC converters, respectively.

Figure 4:
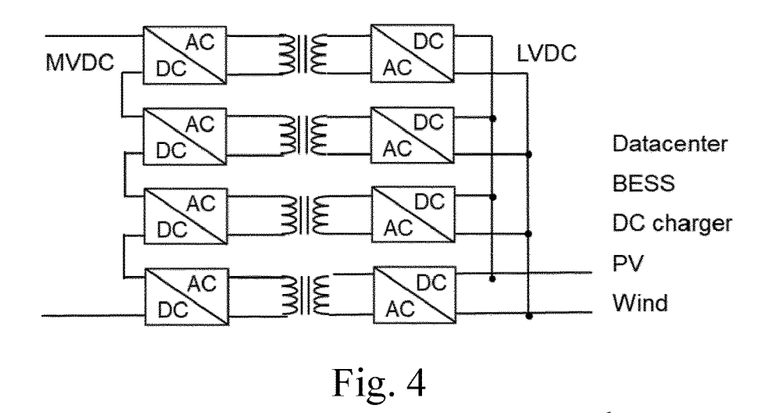

A MVDC/LVDC converter using ISOP according to the prior art based on the dual active bridge (DAB) converter is shown in FIG. 4. It comprises a plurality of DC/AC converters connected in series and coupled to respective AC/DC converters via a transformer per DC/AC AC/DC pair. The LVDC outputs are connected in parallel. The DAB can control the output voltage at the price of clearly lower power conversion efficiency.

SUMMARY

It is therefore an object of the present disclosure to provide a flexible and highly efficient power grid. The power grid may also be referred to as power redistribution grid or power distribution and collection grid. The power grid is particularly able to serve various applications like variable heatpump systems, hyperscale datacenters, distributed battery energy storage and physically distributed or collocated DC chargers. Individual serial outputs of DC/DC converters may be provided without affecting the remaining DC/DC converters. Furthermore, an integration of renewable energy sources is achieved.

The present disclosure is defined in the independent claims. Dependent claims describe preferred embodiments.

The disclosure relates to a power grid, comprising a converting stage comprising a plurality of DC/DC converters. At least one of the DC/DC converters is a single-stage isolated DC/DC converter comprising a voltage control configured to control a voltage of the respective DC/DC converter. The DC/DC converters are connected in series and at least one of the plurality of converters of the converting stage is configured to provide a respective predetermined output voltage to a load.

Various embodiments may preferably implement the following features.

Preferably, each of the plurality of DC/DC converters may comprise at least one DC/AC converter and a plurality of AC/DC converters. The at least one DC/AC converter and the at least one AC/DC converter may preferably be configured to be connected to a transformer unit, the transformer unit comprising at least one transformer coupling the at least one DC/AC converter to the plurality of AC/DC converters. The transformer unit may preferably comprise one winding per DC/AC converter and one winding per AC/DC converter, and the windings of the transformer unit may share a common core.

Preferably, the power grid comprises another converting stage upstream of the plurality of DC/DC converters. Preferably, the other converting stage comprises a DC/DC converter having a controlled voltage output. Preferably, the other converting stage comprises an AC/DC converter having a controlled voltage output.

Preferably, each of the plurality of DC/DC converters comprises a plurality of DC/AC converters and a plurality of AC/DC converters. The at least one DC/AC converter and the at least one AC/DC converter may be configured to be connected to a transformer unit, the transformer unit comprising a plurality of transformers coupling the plurality of DC/AC converters to the plurality of AC/DC converters. At least two of the plurality of transformers may be connected by an impedance circuit.

Preferably, the impedance circuit comprises a winding and an impedance for at least two of the plurality of AC/DC converters, and the windings and the impedances are interconnected.

Preferably, each of the plurality of DC/DC converters comprises a plurality of DC/AC converters and a plurality of AC/DC converters, wherein the at least one DC/AC converter and the at least one AC/DC converter are configured to be connected to a transformer unit, the transformer unit comprising a transformer coupling the plurality of DC/AC converters to the plurality of AC/DC converters. The power grid preferably further comprises a plurality of second DC/DC converters upstream of and connected to each of the plurality of DC/AC converters. The second DC/DC converters may be connected in series and preferably an impedance is connected between two of the plurality of second DC/DC converters and preferably a capacitor is connected in parallel to the plurality of second DC/DC converters.

The power grid preferably further comprises a power distribution unit configured to distribute the power to at least one consumer load. The power distribution unit preferably comprises at least one switch per converter of the second converting stage configured to connect or disconnect outputs of at least two converters of the second converting stage.

Preferably, the power distribution unit comprises a plurality of switches per converter configured to connect or disconnect outputs of the second converting stage, wherein the number of switches corresponds to the number of loads.

Preferably, the power distribution unit further comprises a control unit configured to control the at least one switch to distribute power according to loads and/or sources connected to the power grid, and/or the control unit is configured to manage assignment of the output voltages of the plurality of converters of the second converting stage according to loads and/or sources connected to the power grid.

Preferably, the power grid further comprises a DC current limiting and/or breaking unit.

Preferably, the power grid is connected to a Medium Voltage Direct Current, MVDC, and wherein preferably the MVDC is variable.

Preferably, the power grid is connectable to at least one of variable speed heatpump systems, hyperscale datacenters, distributed battery energy storage, physically distributed or collocated DC chargers, and renewable energy sources.

The present disclosure further relates to a method for controlling a power grid, preferably as described above. The method comprises converting, by a converting stage comprising a plurality of DC/DC converters, an input voltage into an output voltage, connecting the plurality of DC/DC converters in series, wherein each of the DC/DC converters is a single-stage isolated DC/DC converter, controlling, by a voltage control, the voltage of the respective DC/DC converters, and providing a respective predetermined output voltage to a load at each of the plurality of converters of the converting stage.

The present disclosure is further defined by the following items.

1. Power grid, comprising
   a converting stage comprising a plurality of DC/DC converters,
   wherein at least one of the DC/DC converters is a single-stage isolated DC/DC converter comprising a voltage control configured to control a voltage of the respective DC/DC converter,
   wherein the DC/DC converters are connected in series,
   wherein at least one of the plurality of converters of the converting stage is configured to provide a respective predetermined output voltage to a load.

Various embodiments may preferably implement the following features.

2. Power grid according to item 1, wherein each of the plurality of DC/DC converters comprises at least one DC/AC converter, a plurality of AC/DC converters, wherein the at least one DC/AC converter and the at least one AC/DC converter are configured to be connected to a transformer unit, the transformer unit comprising at least one transformer coupling the at least one DC/AC converter to the plurality of AC/DC converters, wherein the transformer unit comprises one winding per DC/AC converter and one winding per AC/DC converter, and the windings of the transformer unit share a common core.

3. Power grid according to item 1, further comprising another converting stage upstream of the plurality of DC/DC converters,
   wherein preferably the other converting stage comprises a DC/DC converter having a controlled voltage output, or
   wherein preferably the other converting stage comprises an AC/DC converter having a controlled voltage output.

4. Power grid according to item 1, wherein each of the plurality of DC/DC converters comprises a plurality of DC/AC converters, a plurality of AC/DC converters, wherein the at least one DC/AC converter and the at least one AC/DC converter are configured to be connected to a transformer unit, the transformer unit comprising a plurality of transformers coupling the plurality of DC/AC converters to the plurality of AC/DC converters,
   wherein at least two of the plurality of transformers are connected by an impedance circuit.

5. Power grid according to item 4, wherein the impedance circuit comprises a winding and an impedance for at least two of the plurality of AC/DC converters, and wherein the windings and the impedances are interconnected.

6. Power grid according to item 1, wherein each of the plurality of DC/DC converters comprises a plurality of DC/AC converters, a plurality of AC/DC converters, wherein the at least one DC/AC converter and the at least one AC/DC converter are configured to be connected to a transformer unit, the transformer unit comprising a transformer coupling the plurality of DC/AC converters to the plurality of AC/DC converters,
   wherein the power grid further comprises a plurality of second DC/DC converters upstream of and connected to each of the plurality of DC/AC converters,
   wherein the second DC/DC converters are connected in series,
   wherein preferably an impedance is connected between two of the plurality of second DC/DC converters, and
   wherein preferably a capacitor is connected in parallel to the plurality of second DC/DC converters.

7. Power grid according to any one of the preceding items, further comprising a power distribution unit configured to distribute the power to at least one consumer load, wherein the power distribution unit preferably comprises at least one switch per converter of the second converting stage configured to connect or disconnect outputs of at least two converters of the second converting stage.

8. Power grid according to item 7, wherein the power distribution unit comprises a plurality of switches per converter configured to connect or disconnect outputs of the second converting stage, wherein the number of switches corresponds to the number of loads.

9. Power grid according to item 7 or 8, wherein the power distribution unit further comprises a control unit configured to control the at least one switch to distribute power according to loads and/or sources connected to the power grid, and/or wherein the control unit is configured to manage assignment of the output voltages of the plurality of converters of the second converting stage according to loads and/or sources connected to the power grid.

10. Power grid according to any one of the preceding items, wherein the power grid further comprises a DC current limiting and/or breaking unit.

11. Power grid according to any one of the preceding items, wherein the power grid is connected to a Medium Voltage Direct Current, MVDC, and wherein preferably the MVDC is variable.

12. Power grid according to any one of the preceding items, wherein the power grid is connectable to at least one of variable speed heatpump systems, hyperscale datacenters, distributed battery energy storage, physically distributed or collocated DC chargers, and renewable energy sources.

13. Method for controlling a power grid, preferably according to one of the preceding items, the method comprising:
   converting, by a converting stage comprising a plurality of DC/DC converters, an input voltage into an output voltage,
   connecting the plurality of DC/DC converters in series, wherein each of the DC/DC converters is a single-stage isolated DC/DC converter,
   controlling, by a voltage control, the voltage of the respective DC/DC converters, and
   wherein the method further comprises providing a respective predetermined output voltage to a load at each of the plurality of converters of the converting stage.

BRIEF DESCRIPTION OF THE DRAWINGS

The disclosure is further described with reference to the attached drawings. Therein.

In case not indicated otherwise, elements with the same reference signs or symbols denote the same or similar elements in the respective figures.

DETAILED DESCRIPTION

To support the growing power needs and to achieve physically distributed systems, the common DC bus voltage is of the Medium Voltage Direct Current (MVDC) type according to an embodiment. To minimize costs for multiple applications, which need to serve several lower power loads and sources it is beneficial, if the series connected DC/DC converters are loaded differently. Related to the state of the art technology different loading of DC/DC converters leads to changes on the input voltage at the MVDC side. The present disclosure is able to provide, in contrast to the state-of-the-art technology having a series input and parallel output topology, individual parallel DC outputs.

Figure 5A:
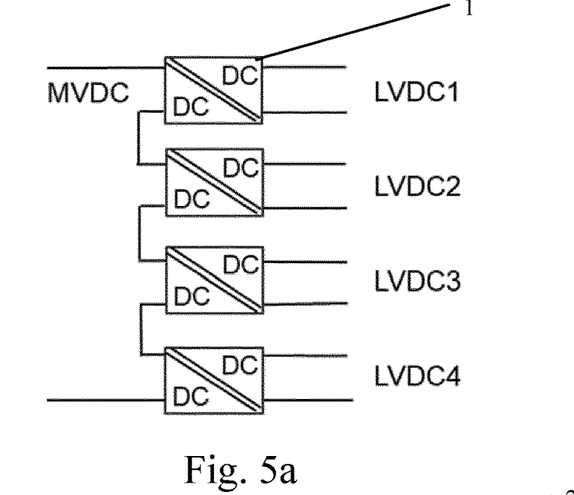
FIGS. 5a and 5b show the targeted functionality according to the present disclosure.

FIG. 5a shows a targeted functionality of the system according to the present disclosure. In particular, a MVDC input is provided which serves a plurality of DC/DC converters 1 in order to provide multiple Low Voltage Direct Current (LVDCx) outputs. The DC/DC converters 1 may form or be referred to as a converting stage. The detailed configuration of the DC/DC converter will be described below and illustrated in FIG. 7. Each of the DC/DC converters may comprise at least one DC/AC converter 11 (shown in FIG. 7, first converting stage) receiving the MVDC input and as well as at least one AC/DC converter 13 (shown in FIG. 7, second converting stage) providing the output. According to an embodiment, the AC/DC converters 13 correspond to the DC/AC converters 11 and supply a plurality of LVDC outputs to loads. A transformer unit 12 may couple the DC/AC converters 11 to the AC/DC converters 13. The DC/AC converters 11 are structured as a plurality of single converters connected in series, while the AC/DC converters 13 are connected in parallel. The proposed system thus comprises multiple isolated DC/DC converters 1 which provide parallel outputs. Each of the DC/DC converters 1 may further be equipped with a voltage control functionality. Through this, individual loads may be connected without affecting stability of the grid. In other words, all of the isolated DC/DC converters 1 may provide a predetermined output voltage, and the output voltages may be different. Furthermore, the grid may be connected to an energy source and redistribute the input energy to different loads. In other words, the systems according to the examples described below may be of a bi-directional type.

Figure 5B:
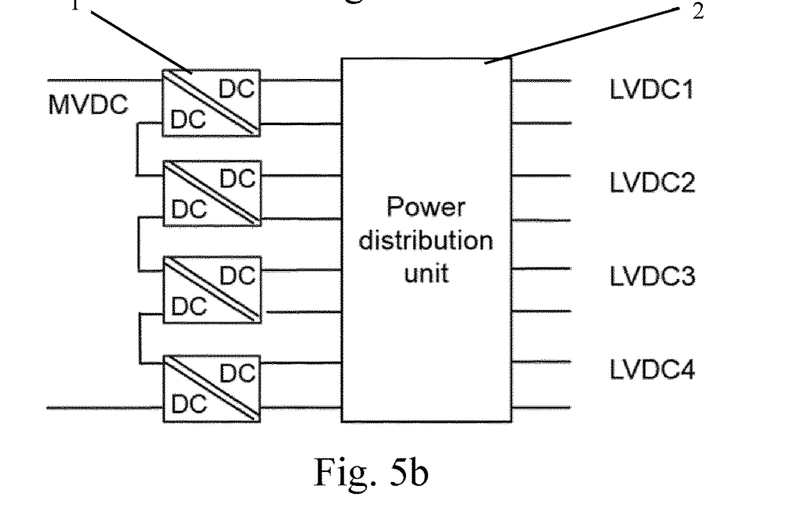

The system may further be enhanced with a power distribution unit as depicted in FIG. 5b. Thus, FIGS. 5a and b show a MVDC/LVDC converter with series connected isolated DC/DC converters 1 serving multiple loads or sources. The outputs may optionally be configured to provide different power levels. This structure enhances flexibility and efficiency of power distribution and collection grids since the outputs may be configured independently or connected according to the load to provide a higher power output.

According to an embodiment, at least one of the converting stages comprises Solid State Transformers (SST). The DC/DC converters 1 are particularly designed as single-stage isolated DC/DC converters 1 comprising a voltage control configured to control a voltage of the respective DC/DC converter 1.

Figure 6:
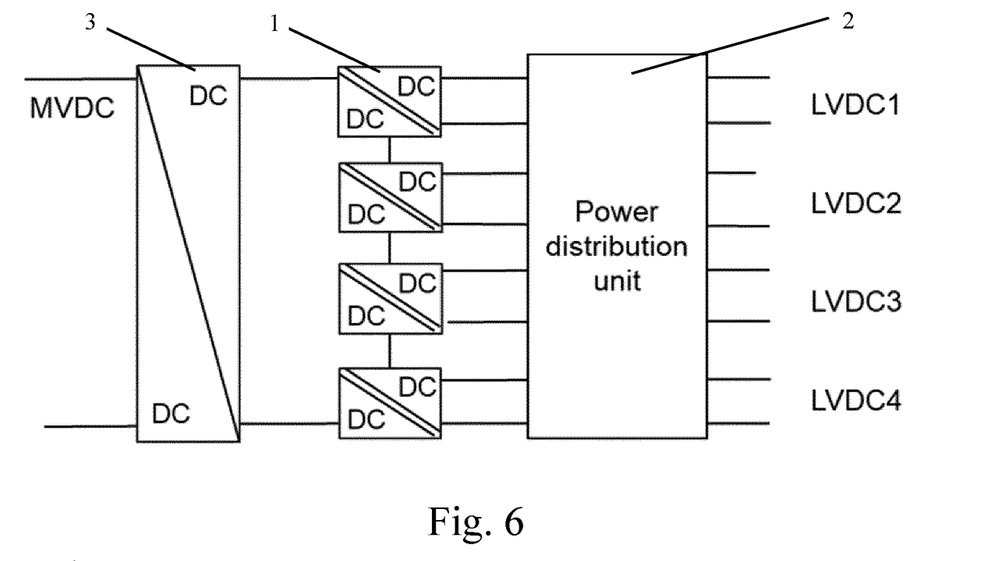
FIGS. 6 to 13 show examples according to the present disclosure.

The disclosure will be further described referring to various examples. According to a first example shown in FIG. 6, a variable MVDC input is used for the system. By allowing the MVDC bus to be variable and to adapt to the needed power levels, it is possible to serve multiple differently loaded LVDC connections. The variable MVDC bus can be supplied by a grid converter supporting variable DC-Link operation, i.e., a Modular Multi-Level Converter (MMC) converter with some full-bridge cells, or by an (non-isolated) DC/DC converter 3 connected to the constant MVDC Link. This DC/DC conversion stage could also be distributed to the isolated DC/DC cells, allowing a more modular implementation. The DC/DC conversion stage serves as a pre-regulation and allows for a stable system. According to an example, the DC/DC conversion stage has a controlled voltage output. According to an example, the DC/DC conversion stage may be substituted by an AC/DC converter or an AC/DC conversion stage having a controlled voltage output. The AC/DC conversion stage may also act as a pre-regulation. The example according to FIG. 6 may also be equipped with a multi-winding transformer. Possible implementations of the power distribution unit are described below.

FIGS. 7 to 10 show further embodiments of a DC/DC converter according to the present disclosure.

Figure 7:
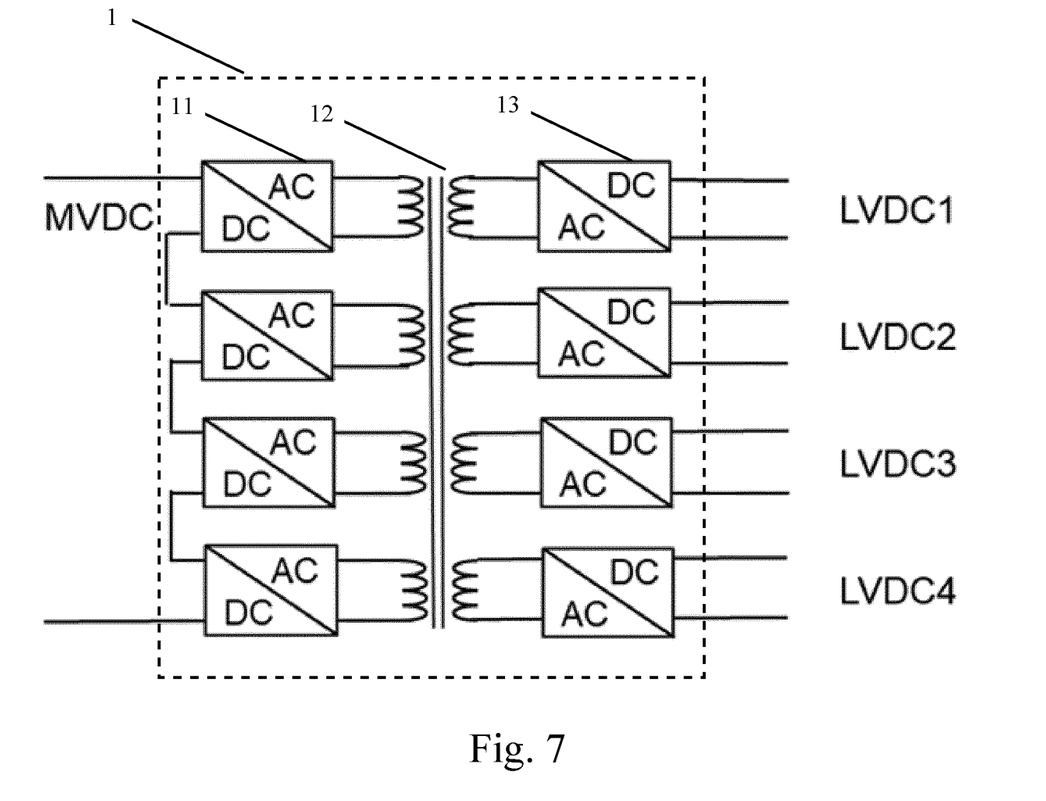

In particular, according to FIG. 7, a MVDC to LVDC converter with series DC/DC converters 1 and a multi-winding transformer 12 is provided. According to this example, the transformer 12 has a single core shared between the primary winding(s) and the secondary winding (s). The DC/DC conversion may be of the Dual Active Bridge (DAB) or the Series Resonant Converter (SRC) type. In more detail, FIG. 7 shows a first converting stage comprising four DC/AC converters 11 and a second converting stage comprising four respective AC/DC converters 13. The first and second converting stages are coupled by a transformer unit 12, in the present case a multi-winding transformer 12 having a common core. Each of the AC/DC converters 13 of the second converting stage provides a LVDC output to be connected to a load. The converters may be configured to provide the same or different power ratings and may also be interconnectable in order to provide higher power for higher loads such as fast charging of vehicles. This functionality may be achieved by a power distribution unit to be described below.

The power flow to and from MVDC and each LVDC port can be controlled separately. This requires isolated DC/DC converters 1 (i.e., DAB or SRC type) with voltage ratio control functionality or alternatively fixed voltage ratio supported by pre- or post-regulation stages. The number of transformer windings is flexible and can have different number on MVDC and LVDC side.

Figure 8:
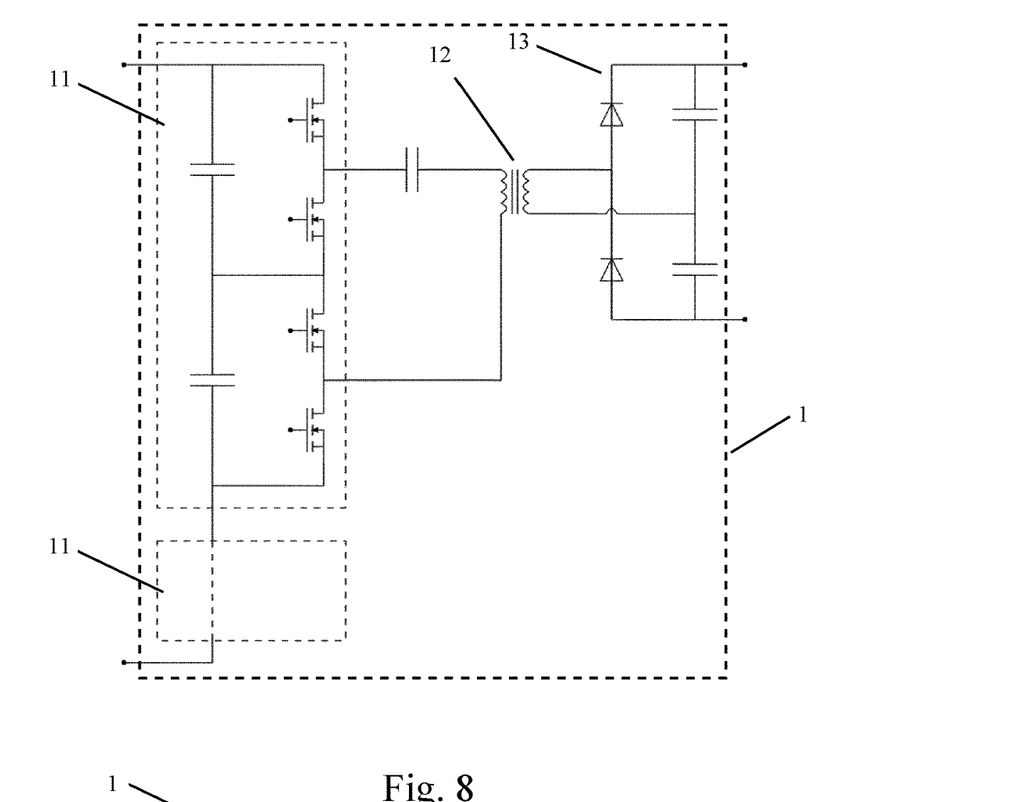

According to a preferred example shown in FIG. 8, a plurality of SiC MOSFET cells each forming an DC/AC converter 11 is provided which are connected in series. A transformer unit 12 as well as an AC/DC converter 13, in this case using diodes, is depicted in accordance with other embodiments. The advantage of this example is that the power rating of the multi-winding transformer is N-times higher, wherein N=number of cells with equal power. This leads to lower costs equal to $(0.75^N)/N$.

Figure 9:
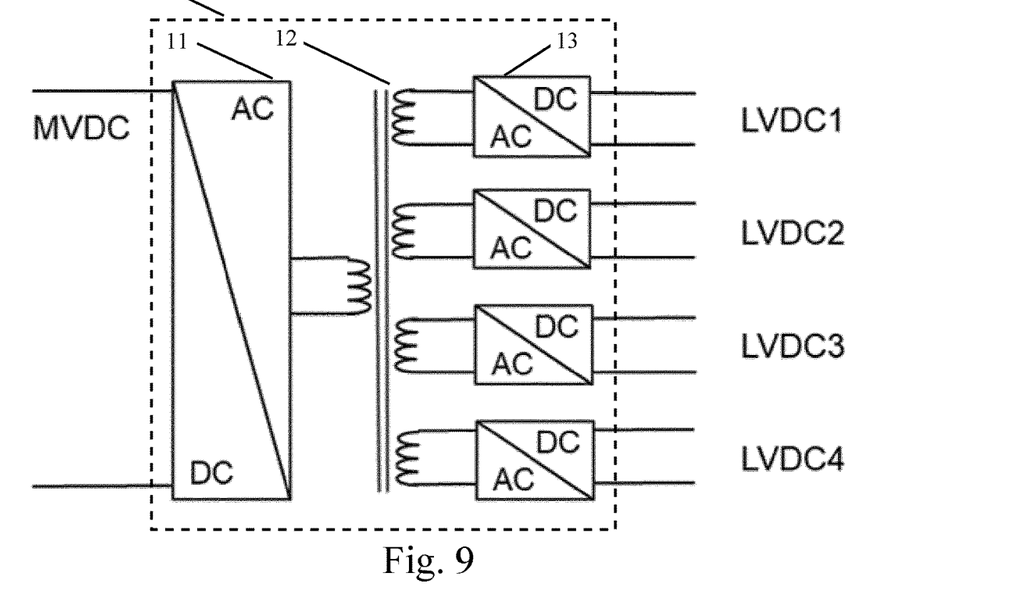

FIG. 9 shows an alternative configuration of an MVDC/LVDC converter based on series DC/DC converters 1 and a multi-winding transformer 12 having a different number of MVDC windings with respect to the examples above. In particular, the DC/DC converter 1 comprises a single DC/AC converter 11, a plurality of AC/DC converters 13 for providing an output voltage, and a transformer unit 12 having a primary winding for the DC/AC converter 11 and secondary windings for each of the AC/DC converters 13. The transformer unit 12 also has a common core and is therefore similar to the configuration according to FIG. 7. The DC/DC converter 1 may be of the DAB or SRC type.

Figure 10:
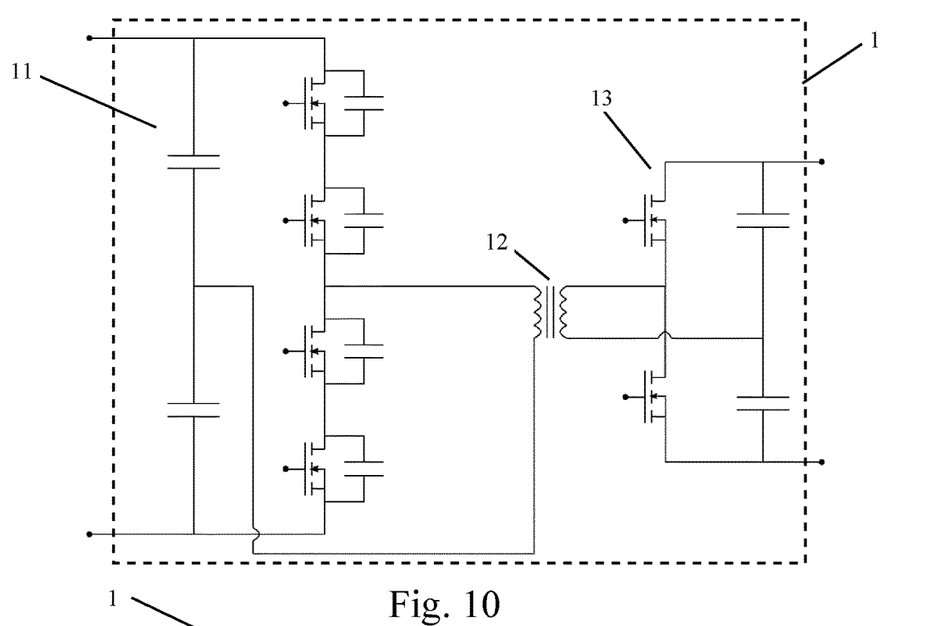

In FIG. 10 showing a further exemplary configuration, the first converting stage, i.e., the DC/AC converter 11, comprises SiC MOSFETs which are connected in series. Capacitors may optionally be provided in parallel to the respective MOSFETs. The second converting stage, i.e., the AC/DC converter 13, which is connected to the first converting stage 11 via a transformer unit 12, also comprises MOSFETs in order to convert the received AC power to a LVDC output. The functionality of the depicted example is similar to the other examples described herein.

Figure 11:
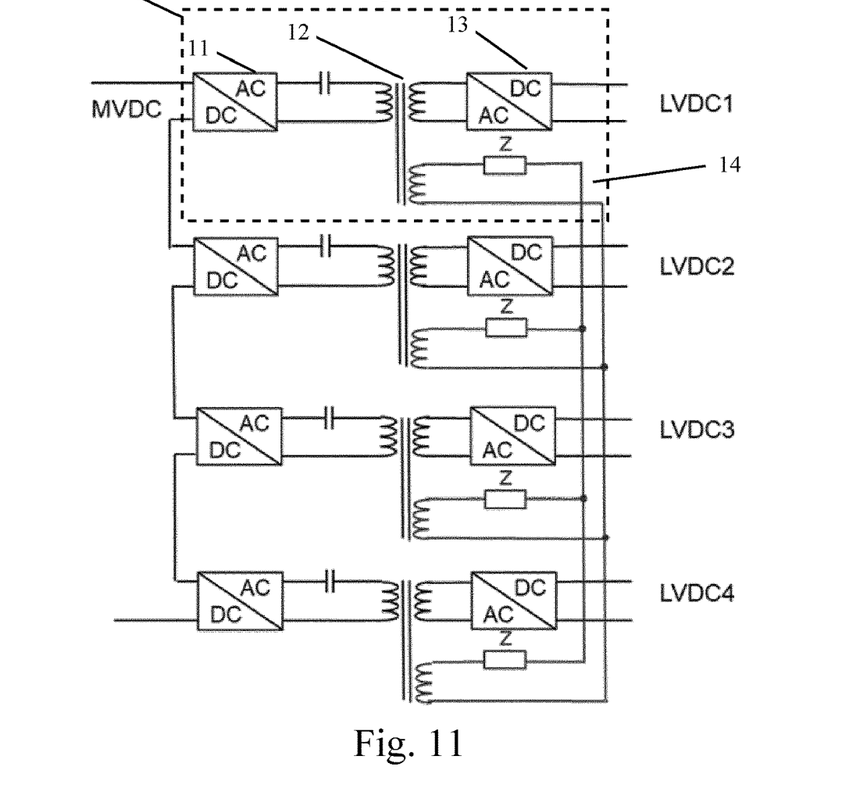

In the example according to FIG. 11, a MVDC/LVDC converter with series DC/DC converters 1 is shown. Furthermore, multiple multi-winding transformers 12 are provided. According to an embodiment, one multi-winding transformers 12 per DC/AC/AC/DC converter pair (1, 11, 12, 13). An impedance Z may be needed for impedance adjustments or for controlling the energy exchange. In particular, an impedance circuit 14 may interconnect some or all of the transformers 12. The impedance circuit 14 may act as a balancer. Similar results can be achieved as in the case of the examples described with reference to FIGS. 7 to 10.

Figure 12:
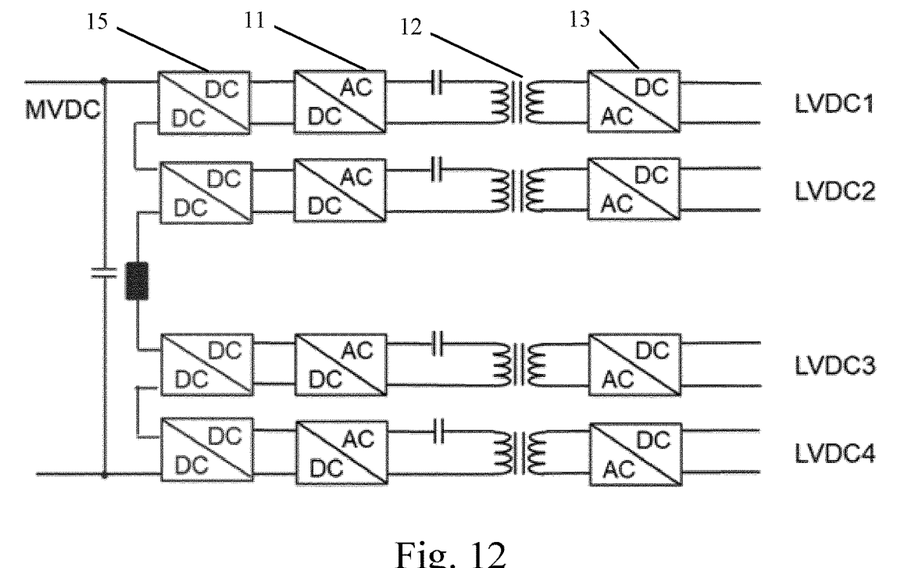

According to a further example, a pre-regulation stage for cell power exchange at the MVDC side, i.e., exchange between the respective converters of the first converting stage, may be provided. This is shown in FIG. 12. The pre-regulation stage may be based on a Modular Multi-Level Converter (MMC) stage. In particular, the power redistribution grid may further comprise a plurality of second DC/DC converters upstream of and connected to each of the plurality of DC/AC converters 11 (which form part of the isolated DC/DC converters 1). The second DC/DC converters are connected in series, wherein exemplarily an impedance is connected between two of the plurality of second DC/DC converters. Furthermore, a capacitor is connected in parallel to the plurality of second DC/DC converters. This allows a circulating current through all of the DC/DC stages and acts as a power balancer.

Figure 13:
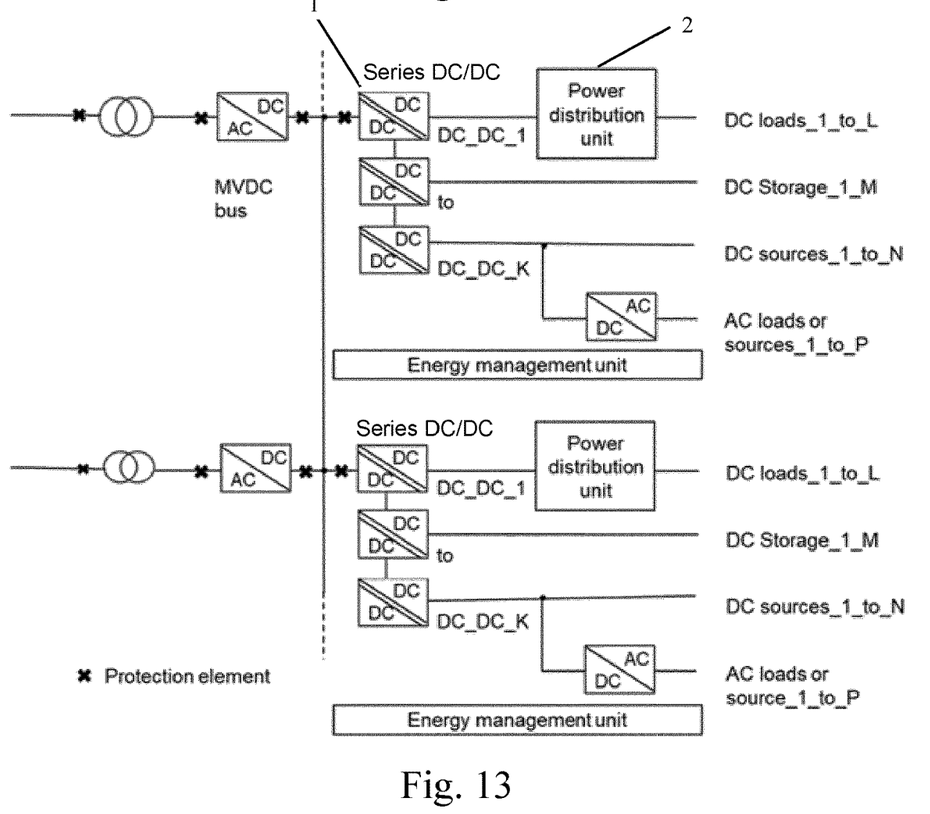

FIG. 13 shows an overview of a power grid according to the present disclosure using series DC/DC converters 1 which are formed as Solid State Transformers (SST). The grid comprises an energy management unit configured to control operation of the grid and a power distribution unit. According to the depicted example, a plurality of outputs 1 to L may be provided for DC loads (DC loads_1_to_L) and the outputs may be controlled or connected by the power distribution unit. Furthermore, at least one output for DC power storage DC (Storage_1_M) and at least one input for DC sources (DC sources_1_to_N) may be provided. A further connection may be provided for at least one AC load or source (AC loads or sources_1_to_P). This evidently requires a DC/AC converter as shown in the figure.

Each of the examples described with reference to FIGS. 6 to 13 may be combined with a power distribution unit 2 configured to connect or disconnect DC outputs to loads.

Figure 14:
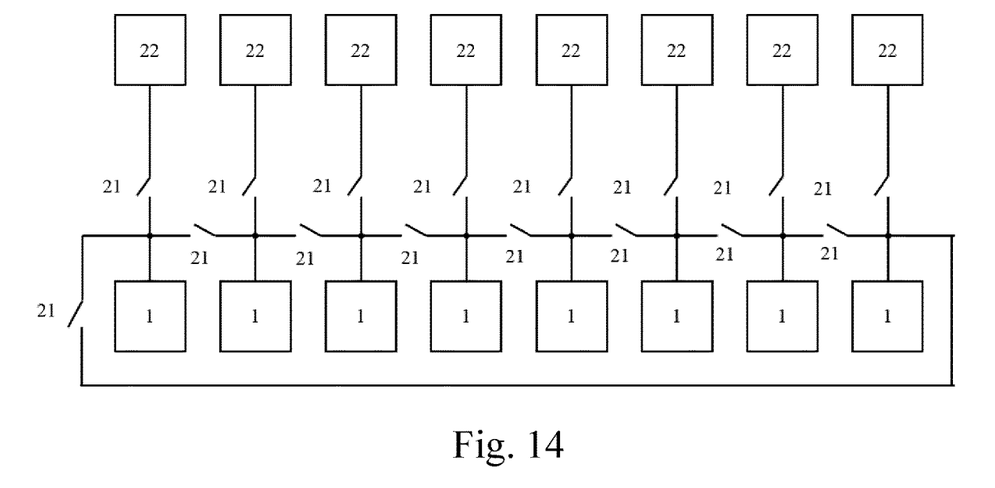
FIGS. 14 to 16 show examples of a power distribution unit according to the present disclosure.

This is described with reference to an exemplary vehicle charging system using charging poles as loads 22 that can be connected to a vehicle to be charged. In case each charging pole 22 gets its own bus and each DC converter 1 can be connected to each of these busses, there would be nine switches (3×3) necessary for three poles and three outputs, and one hundred switches for ten outputs and ten poles. I.e., there is a quadratic growth for the number of switches related to the number of outputs. An alternative solution in order to save switches could be a ring structure, with each DC-output connectable by disconnectors or switches 21 to two neighboured outputs and with each charging pole 22 directly connectable via a disconnector 21 to one of the DC outputs. This is shown in FIG. 14, wherein the reference sign 1 denotes the DC/DC converters and the respective the DC outputs and the reference sign 22 denotes the loads or charging poles according to the example described above. This arrangement allows to use 2×n switches 21 only, n being the number of outputs. A smart management of the sequence of connecting vehicles to free poles 22 may be employed in order to use the available power most efficiently. Target of this management would be to always provide a high probability to have at least one pole 22 available for fast charging with double power, which can be achieved by connecting adjacent DC outputs via the switches 21, and on the other hand load all DC outputs equally.

Figure 15:
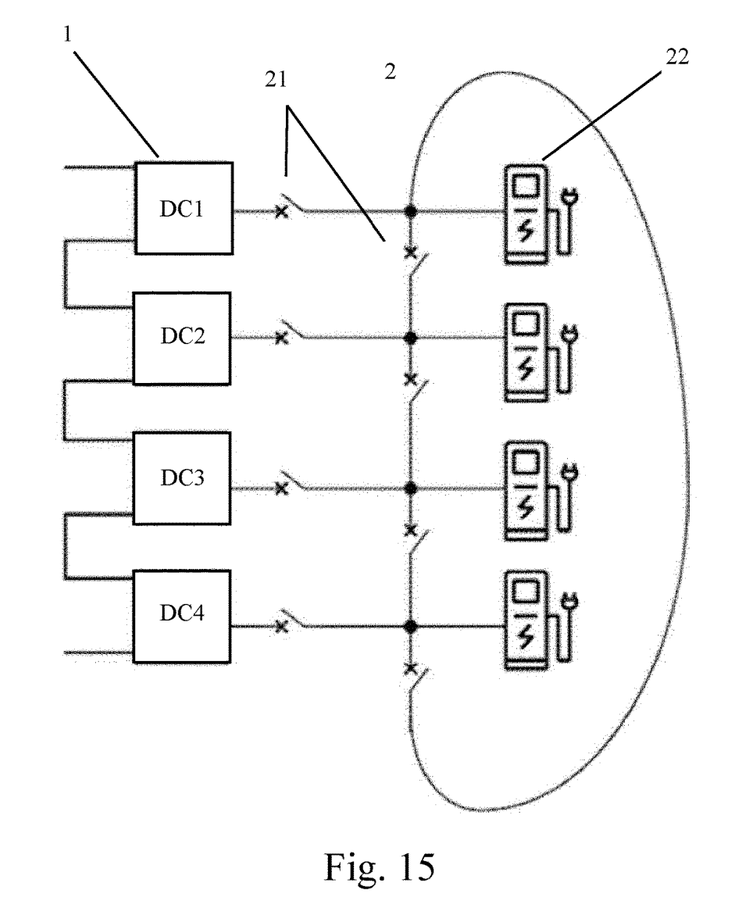

FIG. 15 shows a further exemplary configuration of a power distribution and collection grid including or being connected to a power distribution unit 2. In this example, the switches 21 also form a ring type configuration.

Figure 16:
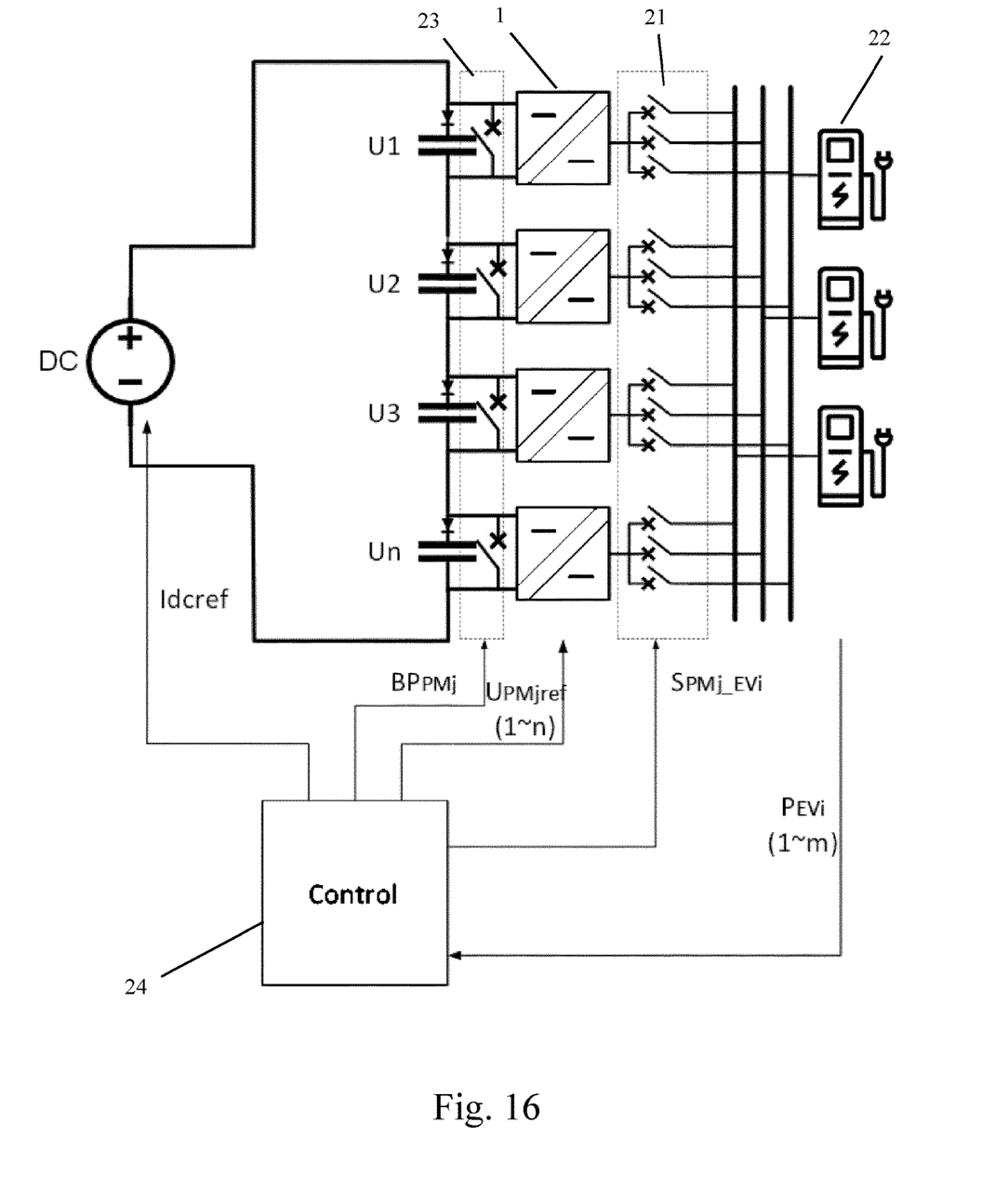

FIG. 16 depicts an alternative configuration which may be referred to as matrix configuration. In each respective output terminal of each DC/DC converter 1, there are N switches 21 connecting with N DC loads respectively. The total number of switches are N*n, wherein N is the number of loads 22, in this case charging poles, and n is the number of DC/DC converters 1. The matrix type switching group can be used in an application where there is no requirement to open a short circuit current. If the switches just need to open a current of normal operation, the switching current of matrix type is just (1/N) of the current according to the ring type.

In other words and referring to the examples described above, the system may be based on a SST topology, wherein the key components in the topology are several isolated DC/DC converters 1 and switching groups. The isolated DC/DC converters 1 are connected input terminals in series. The two outermost terminals of the in-series input terminals are connected to an MV DC bus. The output terminals of each isolated DC/DC converter 1 connect all the electric vehicle (EV) chargers via a switching group. The switching groups control their DC/DC converters 1 to join into one appointed EV charger. The MV DC bus is supported by a controllable DC source.

Optionally, the grid may further comprise a control unit 22 and/or a bypass breaker circuit 23. The control unit 24 may also be referred to as (coordination) controller. This controller 24 is proposed for smoothing operation of the proposed SST topology. The controller 24 generates the system operation references and switching orders, including current reference $I_{dcref}$ for the DC source, DC/DC converter 1 voltage references $U_{PMjref}$ and switching group control order $S_{PMj\_EVi}$.

FIG. 16 is thus a schematic view of a power grid and a distribution unit according to an exemplary embodiment showing the principle structure as well as optional features such as the control unit 24, the bypass breaker circuit 23 and the matrix type configuration of the switches 21.

Figure 17:
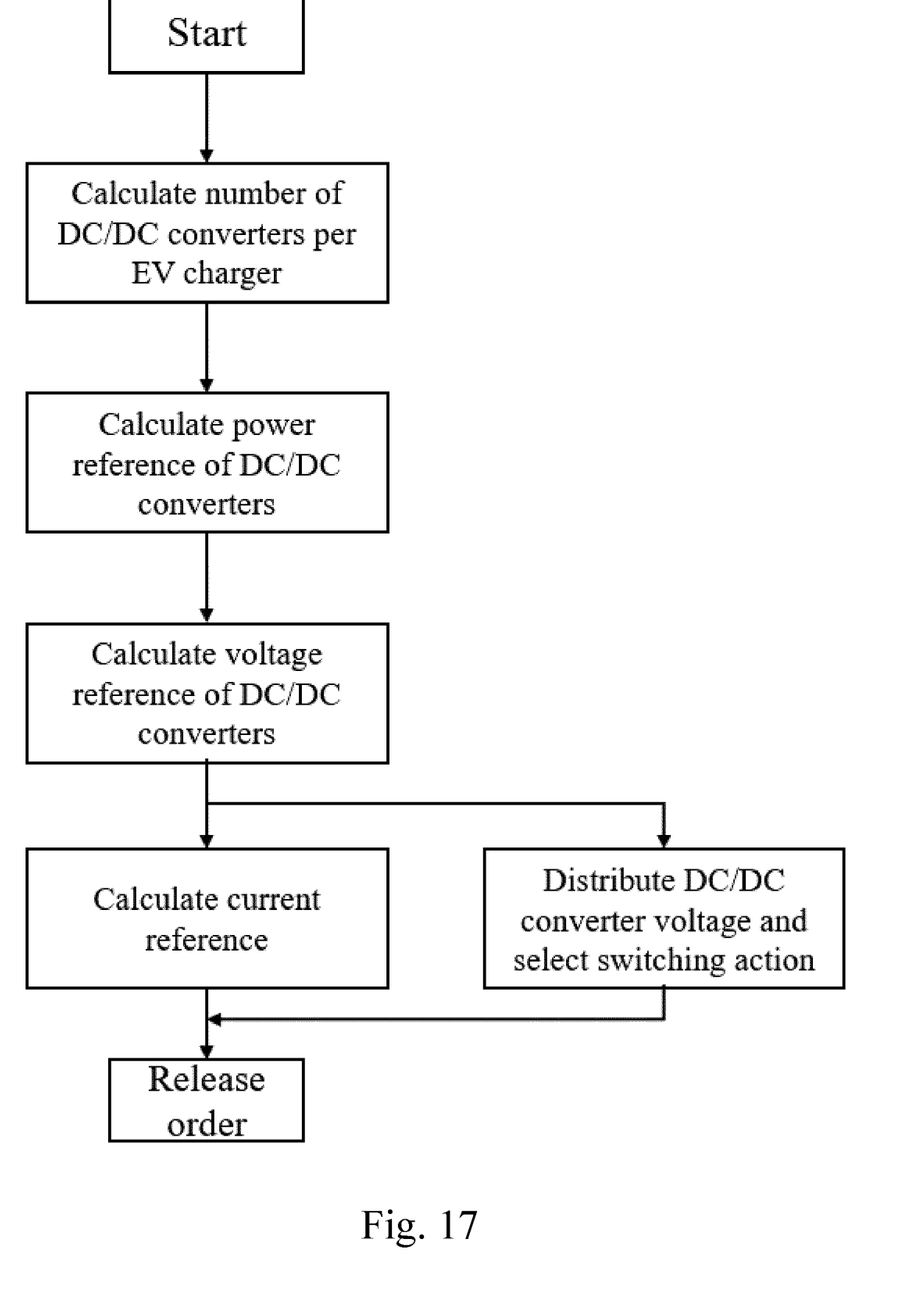
FIGS. 17 and 18 show exemplary flow charts of a control unit.

A flow chart is depicted in FIG. 17. In one control period, the controller 24 firstly calculates a suitable number of power modules (DC/DC converters 1) for each EV charger 22 according to a principle of nearest mean value of all the charger powers and smallest voltage difference. The principle can be explained as the number of power modules switching to the i$^{st}$ charger is calculated with round-off number of the divide result of the i$^{st}$ charger power requirement and mean power of all chargers. The calculation may be exemplarily performed using the following formula (F1).

$$N_{PM\_EVi} = \text{round}\left(\frac{P_{EVi}}{\frac{(P_{EV1}+P_{EV2}+\ldots+P_{EVi}+\ldots+P_{EVm})}{n}}\right) \quad (F1)$$

Consequently, the selected power modules and their voltage references can be calculated, e.g., utilising the formulae (F2) and (F3) shown below. In particular, (F2) is used to calculate the power reference $P_{PMj}$ of the power module j, i.e., the respective DC/DC converter 1. Using (F3), a voltage reference $U_{PMj}$ of the power module j, i.e., the respective DC/DC converter 1, is calculated, wherein N is the number of loads and $U_{PM\_nom}$ denotes the nominal voltage. In addition, a switching group action can be confirmed. The MVDC bus current reference can be also calculated. The calculation may exemplarily be performed with formula (F4) shown below.

$$P_{PMj} = \frac{P_{EVi}}{N_{PM\_EVi}} \quad (F2)$$

$$U_{PMj} = \frac{P_{PMj}}{\sum P_{PMj}} * N * U_{PM\_nom} \quad (F3)$$

$$I_{dcref} = \frac{\sum P_{PMj}}{\sum U_{PMj}} \quad (F4)$$

As mentioned above, the system may also comprise an optional bypass breaker circuit 23. The bypass breaker circuit 23 is exemplarily laid out in the input terminal of each isolated DC/DC converter 1 as shown in FIG. 16. The bypass breaker 23 of each isolated DC/DC converter 1 is used to make the converter be out of service temporarily to avoid too low input DC voltage to ensure operation with high efficiency. In some operation cases, the power difference of the isolated DC/DC converters 1 is very large. Thus, some converters operate in low input DC voltage and consequently have a low operational efficiency. In order to avoid this situation, some of the DC/DC converters 1 are stopped by closing theirs bypass breakers 23. The operating DC/DC converters 1 will get a more uniform power requirement and input DC voltage. However, the bypass breaker 23 is optional in the topology. The bypass breakers 23 may also be controlled by the coordination controller 24.

Figure 18:
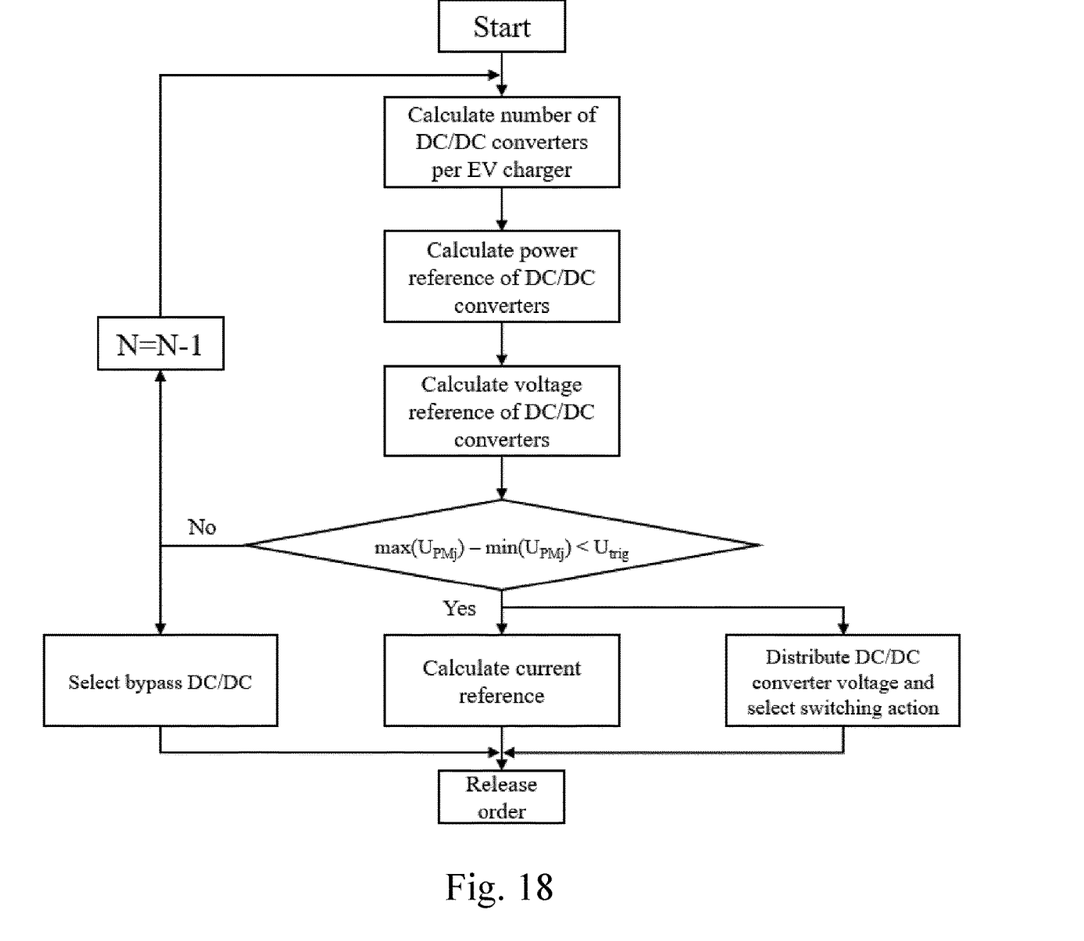

FIG. 18 shows a respective flow chart with bypass breaker 23 functionality. The respective formulae (F1) through (F4) are described above. As long as a difference of the maximum power module voltage and a minimum power module voltage max ($U_{PMj}$)—min ($U_{PMj}$) does not exceed a threshold voltage $U_{trig}$, a normal operation according to FIG. 17 is performed. However, if $U_{trig}$ is exceeded, the bypass breaker circuit 23 is activated to bypass a respective power module, i.e., DC/DC converter, and the number of loads N is reduced.

Furthermore, the controller 24, or station control, may be provided for handling assignment of loads such as charging poles 22 (in case of a DC charger for electric vehicles). Taking an example with four poles (cf. FIG. 15, poles 22), the station control 24 tries to keep two neighboured DC feeds (DC/DC converters 1) free. I.e., after pole 1 was connected to DC1 output, the next vehicle would either be connected to pole 2 or 4 (e.g. via signal lights with a red light above pole 3 indicating that pole 3 is occupied or not to be connected, and green lights above poles 2 and 4 indicating they are available). If done like that, after connecting the second vehicle, two neighboured DC feeds would be available for fast charging. There is no need for no-load at one DC output. In a situation when not all chargers are use, the tie switch can be connected to a neighboured DC output and the load can be shared. In the four pole system as above, when charging pole 1 and 2 are in operation, the tie switches from DC1 to DC4 could be closed and the tie switch between DC2 and DC3. By this, all DC outputs are loaded. Even if running in a situation that poles 1 and 3 are active and a new vehicle comes in—which then could only be charged with the power of one DC output—you could share the load of the higher loaded pole of 1 or 3 with the free remaining DC output by closing the related tie switch.

The power distribution unit may also be combined with other power distribution grids and other loads or sources as presented in the examples herein.

Figure 19:
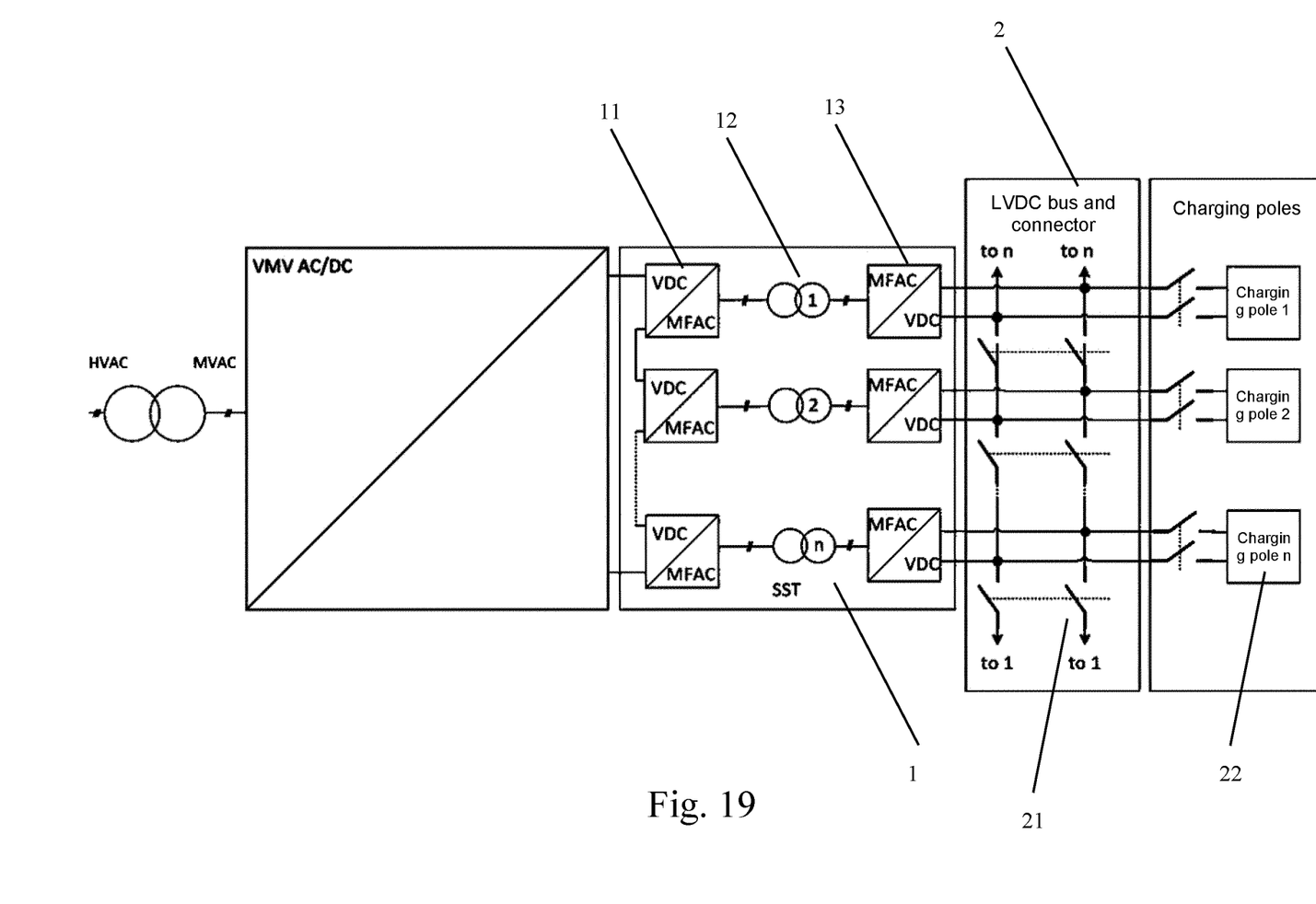
FIG. 19 shows a further example according to the present disclosure.

FIG. 19 is a further example according to the present disclosure. Therein, a high voltage AC (HVAC) input is provided and converted into a medium voltage AC (MVAC) which is fed into an AC/DC converter. Subsequently, a plurality of DC/DC converters 1 which are connected in series is provided. In the example, n denotes the number of DC/DC converters 1, n being an integer. Each of the plurality of DC/DC converters 1 comprises a DC voltage (VDC) to medium frequency AC (MFAC) converter 11, a MFAC to VDC converter 13 and a transformer 12 coupling both converters 11, 13. The DC/DC converters may be provided as isolated single stage converters. Furthermore, any of the examples described above may be used with the example according to FIG. 19 and a detailed description thereof is thus omitted. The plurality of DC/DC converters 1 may employ a solid state transformer (SST) topology. Each of the DC output voltages of the DC/DC converters 1 may be provided to a plurality of switches 21 forming part of a low voltage DC (LVDC) bus and connector system. The LVDC bus and connector system may correspond to the power distribution unit 2. The LVDC bus and connector system is connected to a plurality of loads 1 to n, in this example charging poles 22. In the example of FIG. 19, the ring type switch configuration described above is shown. However, the number of switches 21 may correspond to the number of loads n or may be any even multiple thereof. The functionality of the example according to FIG. 19 is equal to the examples described above.

According to the disclosure, an improved power redistribution grid is provided capable of handling a plurality of inputs and outputs with an optimum efficiency.

The present disclosure also encompasses a corresponding method.

Other aspects, features, and advantages will be apparent from the summary above, as well as from the description that follows, including the figures and the claims.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A power grid, comprising
a converting stage comprising a plurality of DC/DC converters;
at least one of the DC/DC converters being a single-stage isolated DC/DC converter comprising a voltage control configured to control a voltage of the respective DC/DC converter;
the DC/DC converters being connected in series;
wherein at least one of the plurality of converters of the converting stage is configured to provide a respective predetermined output voltage to a load;
each of the plurality of DC/DC converters comprising a plurality of DC/AC converters, a plurality of AC/DC converters, wherein the at least one DC/AC converter and the at least one AC/DC converter are configured to be connected to a transformer unit, the transformer unit comprising a plurality of transformers coupling the plurality of DC/AC converters to the plurality of AC/DC converters; and
at least two of the plurality of transformers being connected by an impedance circuit;
the impedance circuit comprising a winding and an impedance for at least two of the plurality of AC/DC converters; and
the windings and the impedances being interconnected.

2. The power grid according to claim 1, wherein each of the plurality of DC/DC converters comprises at least one DC/AC converter, a plurality of AC/DC converters, wherein the at least one DC/AC converter and the at least one AC/DC converter are configured to be connected to a transformer unit, the transformer unit comprising at least one transformer coupling the at least one DC/AC converter to the plurality of AC/DC converters;
wherein the transformer unit comprises one winding per DC/AC converter and one winding per AC/DC converter, and the windings of the transformer unit share a common core.

3. The power grid according to claim 1, further comprising another converting stage upstream of the plurality of DC/DC converters,
wherein the other converting stage comprises a DC/DC converter having a controlled voltage output; or
wherein the other converting stage comprises an AC/DC converter having a controlled voltage output.

4. The power grid according to claim 1, wherein each of the plurality of DC/DC converters comprises a plurality of DC/AC converters, a plurality of AC/DC converters, wherein the at least one DC/AC converter and the at least one AC/DC converter are configured to be connected to a transformer unit, the transformer unit comprising a transformer coupling the plurality of DC/AC converters to the plurality of AC/DC converters;
wherein the power grid further comprises a plurality of second DC/DC converters upstream of and connected to each of the plurality of DC/AC converters;
wherein the second DC/DC converters are connected in series;
wherein particularly an impedance is connected between two of the plurality of second DC/DC converters; and
wherein particularly a capacitor is connected in parallel to the plurality of second DC/DC converters.

5. The power grid according to claim 1, further comprising a power distribution unit configured to distribute the power to at least one consumer load,
wherein the power distribution unit particularly comprises at least one switch per converter of the second converting stage configured to connect or disconnect outputs of at least two converters of the second converting stage.

6. The power grid according to claim 5, wherein the power distribution unit comprises a plurality of switches per converter configured to connect or disconnect outputs of the second converting stage, wherein the number of switches corresponds to the number of loads.

7. The power grid according to claim 5, wherein the power distribution unit further comprises a control unit configured to control the at least one switch to distribute power according to loads and/or sources connected to the power grid, and/or
wherein the control unit is configured to manage assignment of the output voltages of the plurality of converters of the second converting stage according to loads and/or sources connected to the power grid.

8. The power grid according to claim 1, wherein the power grid further comprises a DC current limiting and/or breaking unit.

9. The power grid according to claim 1, wherein the power grid is connected to a Medium Voltage Direct Current, MVDC, and wherein particularly the MVDC is variable.

10. The power grid according to claim 1, wherein the power grid is connectable to at least one of variable speed heatpump systems, hyperscale datacenters, distributed battery energy storage, physically distributed or collocated DC chargers, and renewable energy sources.

11. A method for controlling a power grid according to claim 1, the method comprising:
converting, by a converting stage comprising a plurality of DC/DC converters, an input voltage into an output voltage,
connecting the plurality of DC/DC converters in series, wherein each of the DC/DC converters is a single-stage isolated DC/DC converter,
controlling, by a voltage control, the voltage of the respective DC/DC converters, and
wherein the method further comprises providing a respective predetermined output voltage to a load at each of the plurality of converters of the converting stage.

12. The method according to claim 11, further comprising:
connecting the power grid to at least one of variable speed heatpump systems, hyperscale datacenters, distributed battery energy storage, physically distributed or collocated DC chargers, and renewable energy sources.

13. The method according to claim 11, wherein the power grid further comprises a plurality of second DC/DC converters upstream of and connected to each of the plurality of DC/AC converters and at least one switch per second DC/DC converters, the method further comprising:
controlling each of the at least one switch to connect or disconnect outputs of the plurality of second DC/DC converters.

14. The method according to claim 13, wherein the method further comprises providing a respective predetermined output voltage to a load at each of the plurality of second DC/DC converters.

15. The method according to claim 11, further comprising:
controlling an input voltage to the power grid to provide a variable DC input to the plurality of DC/DC converters.

16. The method according to claim 15, wherein controlling the input voltage to the power grid comprises controlling a Modular Multi-Level Converter (MMC) converter.

17. The method according to claim 11, further comprising:
calculating a number of DC/DC converters per electric vehicle (EV) charger;
for each of the number of DC/DC converters:
calculating a power reference of the DC/DC converters;
calculating a voltage reference of the DC/DC converters; and
distributing DC/DC converter voltage and selecting a switching action for the DC/DC converters.

18. The method according to claim 17, further comprising:
responsive to an output voltage of one of the number of DC/DC converters operating in a low input DC voltage and having a lows operational efficiency, stopping the one of the number of DC/DC converters from operating.

19. The method according to claim 18, wherein stopping the one of the number of DC/DC converters from operating comprising closing a bypass breaker associated with the one of the number of DC/DC converters.

* * * * *